(12) United States Patent
Nieraad et al.

(10) Patent No.: US 11,281,959 B2
(45) Date of Patent: Mar. 22, 2022

(54) METHOD FOR CONNECTING AN ITEM OF DISHWARE TO AN INFORMATION CARRIER AND APPARATUS COMPRISING AN ITEM OF DISHWARE AND AN INFORMATION CARRIER

(71) Applicant: Rastal GmbH & Co. KG, Höhr-Grenzhausen (DE)

(72) Inventors: Thomas Nieraad, Hofheim (DE); Carsten Kehrein, Koblenz (DE)

(73) Assignee: Rastal GmbH & Co. KG, Hohr-Grenzhausen (DE)

( * ) Notice: Subject to any disclaimer, the term of this patent is extended or adjusted under 35 U.S.C. 154(b) by 0 days.

(21) Appl. No.: 17/071,617

(22) Filed: Oct. 15, 2020

(65) Prior Publication Data

US 2021/0117752 A1 Apr. 22, 2021

(51) Int. Cl.
*G06K 19/08* (2006.01)
*G06K 7/10* (2006.01)
*G06K 19/07* (2006.01)

(52) U.S. Cl.
CPC ....... *G06K 19/083* (2013.01); *G06K 7/10128* (2013.01); *G06K 19/0723* (2013.01)

(58) Field of Classification Search
CPC ............. G06K 19/083; G06K 7/10128; G06Q 30/0623
USPC ........................... 235/439, 381, 383; 264/275
See application file for complete search history.

(56) References Cited

U.S. PATENT DOCUMENTS

| 6,248,199 | B1 | 6/2001 | Smulson |
| 8,298,873 | B2 | 10/2012 | Fukuda et al. |
| 9,881,331 | B2 * | 1/2018 | Zises ...................... G06Q 20/32 |
| 10,071,593 | B2 * | 9/2018 | Becker ...................... B44C 1/16 |
| 2005/0087255 | A1 * | 4/2005 | Humphrey ........... B67D 1/1236 141/94 |
| 2007/0141760 | A1 | 6/2007 | Ferguson et al. |
| 2007/0158293 | A1 * | 7/2007 | Andreani ........... G08B 13/2402 215/12.1 |

(Continued)

FOREIGN PATENT DOCUMENTS

DE 202017007108 U1 9/2019
EP 2264652 B1 6/2016

(Continued)

*Primary Examiner* — Allyson N Trail
(74) *Attorney, Agent, or Firm* — Holzer Patel Drennan (57) ABSTRACT

According to the invention there is provided a method of connecting a crockery item to a contactless readable electronic information carrier comprising the steps: providing the crockery item, the crockery item comprising a material selected from a group consisting of glass, ceramic and plastic or a combination thereof, applying a carrier layer to a surface of the crockery item, applying the information carrier to a surface of the carrier layer, that is remote from the surface of the crockery item, wherein a base surface of the information carrier is smaller than a surface of the carrier layer, and applying a cover layer of printing ink in such a way that the cover layer at least portion-wise covers a surface of the information carrier, that is remote from the carrier layer, and the surface of the carrier layer, wherein the carrier layer includes a plastically deformable material, wherein application of the information carrier to the carrier layer includes impressing the information carrier into the carrier layer.

14 Claims, 4 Drawing Sheets

(56) References Cited

U.S. PATENT DOCUMENTS

| | | | |
|---|---|---|---|
| 2010/0052215 A1* | 3/2010 | Emond | B29C 45/14065 |
| | | | 264/275 |
| 2011/0115610 A1* | 5/2011 | Hughes | G06K 17/0006 |
| | | | 340/10.1 |
| 2018/0189623 A1* | 7/2018 | Forster | G06K 19/07752 |
| 2021/0117752 A1* | 4/2021 | Nieraad | G06K 19/083 |
| 2021/0187970 A1* | 6/2021 | Kawarada | B41J 11/002 |

FOREIGN PATENT DOCUMENTS

| | | | |
|---|---|---|---|
| GB | 2379739 | * | 2/2003 |
| WO | 2018104241 A1 | | 6/2018 |

* cited by examiner

METHOD FOR CONNECTING AN ITEM OF DISHWARE TO AN INFORMATION CARRIER AND APPARATUS COMPRISING AN ITEM OF DISHWARE AND AN INFORMATION CARRIER

SUMMARY

The present invention concerns a method of connecting a crockery item to a contactless readable electronic information carrier comprising the steps providing the crockery item, the crockery item comprising a material selected from a group consisting of glass, ceramic and plastic or a combination thereof, applying a carrier layer to a surface of the crockery item, applying the information carrier to a surface of the carrier layer, that is remote from the surface of the crockery item, wherein a base surface of the information carrier is smaller than a surface of the carrier layer, and applying a cover layer of printing ink in such a way that the cover layer at least portion-wise covers a surface of the information carrier, that is remote from the carrier layer, and the surface of the carrier layer.

In addition the present invention concerns an apparatus comprising a crockery item comprising a material selected from a group consisting of glass, ceramic and plastic or a combination thereof, a carrier layer applied to a surface of the crockery item, a contactless readable electronic information carrier applied to a surface of the carrier layer, that is remote from the surface of the crockery item, and a cover layer of printing ink, wherein a base surface of the information carrier is smaller than a surface of the carrier layer, and wherein the cover layer at least portion-wise covers a surface of the information carrier, that is remote from the carrier layer, and the surface of the carrier layer.

The present invention further concerns a printing apparatus for carrying out the method according to the invention.

Contactless readable electronic information carriers, in particular in the form of RFID transponders, which are applied to a self-adhesive carrier film, are known from the state of the art. They can also be glued on to a crockery item for identification thereof. It will be noted however that such a solution does not present the dishwasher resistance which is frequently wanted nor effective protection from manipulation. In addition, that state of the art does not satisfy the aesthetic demands on glasses for branded drinks.

In addition, EP 3 552 153 A1 discloses a method of connecting a contactless readable information carrier to a crockery item. In that method a frame is fitted around the information carrier applied to the crockery item so that the information carrier can be covered over with a cover layer comprising a printing ink.

In comparison the object of the present invention is to provide a method of connecting a crockery item to a contactless readable electronic information carrier, an apparatus comprising a crockery item and an information carrier fixed thereto and a printing apparatus, which make it possible to effect connection of the information carrier to the crockery item more efficiently.

At least one of the above-mentioned objects is attained by a method of connecting a crockery item to a contactless readable electronic information carrier comprising the steps providing the crockery item, the crockery item comprising a material selected from a group consisting of glass, ceramic and plastic or a combination thereof, applying a carrier layer to a surface of the crockery item, applying the information carrier to a surface of the carrier layer, that is remote from the surface of the crockery item, wherein a base surface of the information carrier is smaller than a surface of the carrier layer, and applying a cover layer of printing ink in such a way that the cover layer at least portion-wise covers a surface of the information carrier, that is remote from the carrier layer, and the surface of the carrier layer, wherein the carrier layer includes a plastically deformable material and wherein application of the information carrier to the carrier layer includes impressing the information carrier into the carrier layer.

The fundamental idea of the method according to the invention is to arrange the information carrier on a carrier layer applied to the crockery item and then impress the information carrier into that carrier layer so that a printable surface is formed from a surface of the information carrier, that is remote from the carrier layer and a surface of the carrier layer, to which the cover layer of printing ink can be applied in conventional manner.

In an embodiment of the invention application of the cover layer of printing ink presupposes a surface involving a sufficiently small structural depth. Such a small structural depth of the surface to be covered is afforded in an embodiment by the combination of the elastically deformable material of the carrier layer and the information carrier surface that is remote from the carrier layer.

In an embodiment of the invention after impression of the information carrier into the carrier layer the surface of the information carrier, that is remote from the surface of the carrier layer, and the surface of the carrier layer together form a closed surface with a roughness, the roughness permitting application of the carrier layer.

In an embodiment of the invention the carrier layer comprises the plastically deformable material. In an embodiment the plastically deformable material of the carrier layer is a plastically deformable plastic, in particular a thermoplastic.

In an embodiment of the invention the carrier layer includes an adhesive material, preferably a self-adhesive material. In that way, when applying the information carrier to the carrier layer, the information carrier is laid on the carrier layer prior to the impression operation without slipping with respect to the carrier layer. Additional adhesive, for example by arranging a self-adhesive film on the information carrier, is possible, but not absolutely necessary.

In an embodiment of the invention a thickness of the carrier layer prior to application of the information carrier is at least as great, preferably greater than a maximum thickness of the information carrier. This configuration of the carrier layer ensures that the surface of the carrier layer, beside the information carrier, after impression of the information carrier into the carrier layer, and the surface of the information carrier, that is remote from the surface of the carrier layer, form a surface at the same level. In that respect the thickness of the information carrier involving the greatest extent is used to denote the maximum thickness of the information carrier.

In an embodiment of the invention the information carrier has two longitudinal sides and two transverse sides, wherein the information carrier is completely surrounded by the material of the carrier layer along the longitudinal sides and the transverse sides after impression of the information carrier into the carrier layer. That ensures that the information carrier is completely imbedded into the carrier layer material.

In a further embodiment of the invention application of the carrier layer is effected by printing, in particular using a screen printing procedure.

In an embodiment the carrier layer serves to conceal the information carrier, when fixed to a transparent crockery item, for example a drinking vessel of glass, for a viewer who is looking through the portion of the crockery item, to which the electronic information carrier is applied.

The cover layer of printing ink which at least portion-wise extends both over the surface of the information carrier itself and also over the surface of the carrier layer provides that the information carrier is at least portion-wise permanently sealed on the crockery item. Depending on the choice of printing ink the cover layer not only prevents detachment of or damage to the information carrier during the period of use of the crockery item but also ensures the required dishwasher resistance.

In an embodiment the cover layer completely covers the surface of the information carrier, that is remote from the surface of the carrier layer, and the surface of the carrier layer. That makes it possible to provide protection for the information carrier and the carrier layer from contamination and damage.

In an embodiment a surface of the cover layer is larger than the surface of the carrier layer so that the cover layer extends over the entire periphery of the carrier layer beyond the carrier layer on to the surface of the crockery item. In such an embodiment the cover layer provides for complete encapsulation of the information carrier.

In an embodiment of the invention application of the cover layer of printing ink includes printing on the cover layer and/or transferring the cover layer in the form of a printed transfer image.

If transfer of the cover layer in the form of a printed transfer image is selected for applying the cover layer of printing ink, then in an embodiment firstly the desired decoration is applied by printing to a carrier paper. Then the finished printed cover layer is applied manually to the crockery item and at least portion-wise over the information carrier and the carrier layer, in the manner of a stick-on label or decal. Finally, the applied transfer image is hardened by the application of heat (temperature treatment).

In an embodiment of the invention the transfer image is printed with an organic ink system.

In comparison therewith, the expression applying the cover layer by printing is used to denote direct printing on the information carrier and/or on the carrier layer and/or on the crockery item. In that printing operation the printing ink is respectively discharged from a printing apparatus, in particular a printing machine like for example a screen-printing machine, on to the respective surface of the crockery item, the information carrier or the carrier layer on the crockery item.

In direct overprinting of the information carrier and the carrier layer with the cover layer of printing ink many different challenges arise, which can be resolved by means of the present invention.

It is found to be problematical that in all embodiments of the present invention at least two different materials, in particular however three different materials, namely a material of the information carrier, a material of the crockery item and a material of the carrier layer, are to be overprinted.

On the other hand, in embodiments the information carrier does not have a completely structure-less surface but rather there is at least one portion of the information carrier, which projects with respect to one of the surfaces of the information carrier.

In particular such a projecting portion is present in embodiments of the information carrier, in which the antenna is printed on to a flat/even substrate and an integrated circuit is applied to the substrate, which includes the electronic circuitry. That electronic circuit then projects as a portion in relation to the surface. To create an attractive aesthetic overall impression the printing ink in an embodiment covers the edges created by the projection of a portion with respect to the otherwise flat surface.

In an embodiment of the invention the cover layer completely covers the surface of the information carrier and the printing ink of the cover layer is applied by printing to the surface of the information carrier in a thickness of at least 100 μm, preferably a thickness of 140 μm and particularly preferably a thickness of at least 250 μm. With a cover layer of such thickness it is possible to even out the edges in relation to the surface of the projecting portion of the information carrier and to apply the coating with the printing ink in such a way that a substantially homogenous and level surface of the cover layer is generated.

For that purpose in an embodiment the viscosity of the printing ink has to be so selected that on the one hand it runs sufficiently after the printing operation to provide for the required levelling of the edges, but on the other hand the viscosity has to be such that the printing ink does not run off the printed surface.

To comply with both conditions the printing ink in an embodiment of the invention is of high viscosity.

In a further embodiment the printing ink is quick drying. In that respect the expression quick-drying printing ink in accordance with the present invention is used to mean that the ink is dust-dry within less than 30 minutes, preferably within less than 10 minutes and particularly preferably within less than one minute, when setting the appropriate drying parameters, and allows direct further processing, in particular coverage with a further layer of printing ink.

Irrespective of the production thereof however the cover layer not only serves for aesthetic coverage of the information carrier but also affords encapsulation of the information carrier and thus protection from external influences like for example cold or hot rinsing water or mechanical pressure on the information carrier. By virtue of the insulating properties of the printing ink covering the information carrier with printing ink also protects it from thermal influences.

In an embodiment of the invention printing of the cover layer is effected using a screen printing procedure, the printing ink being a screen printing ink.

It will be appreciated that in an alternative embodiment basically the printing method according to the invention could also be implemented using pad printing technology with a pad printing ink.

In an embodiment of the invention the printing ink of the cover layer is an organic printing ink. Such organic printing inks do not necessarily require hardening by firing of the ink and can therefore be used for the coating operation, even if the information carrier which is temperature-sensitive is already applied.

In an embodiment of the invention such an organic printing ink comprises at least two components, one of the components being a hardener. In the case of such multi-component printing inks it is possible to set the drying time and adapt it to printing of the combination involved here of the crockery item and the information carrier.

In an embodiment of the invention the printing ink of the cover layer is a metallic printing ink or a metallic replacement ink.

In an embodiment of the method according to the invention the printing ink of the cover layer is hardened by the action of UV radiation on the crockery item with the information carrier and the printing ink. In a further embodiment the printing ink is hardened by heating thereof to a temperature of 70° Celsius or less, preferably 60° Celsius or less and particularly preferably 50° C. or less. Such hardening without firing at temperatures above 70° C. makes it possible to seal the information carrier as described with the cover layer of printing ink.

In an embodiment of the invention a plurality of cover layers are successively applied to the crockery item with the carrier layer and the information carrier. In that respect in an embodiment the individual cover layers are such that their areas increase upwardly from the information carrier. In that way each following cover layer completely covers the subjacent cover layer and projects over the entire periphery of the subjacent cover layer beyond the subjacent cover layer.

In an embodiment of the invention the cover layer is at least portion-wise transparent so that the cover layer makes it possible to view at least a portion of the information carrier. In that way the information carrier for example can permit signaling of information to a user by means of a light emitting diode.

Basically, it is immaterial for the method according to invention, at what position on the crockery item the carrier layer, the information carrier and the cover layer are provided.

The term crockery item is used to denote a utensil which is used when taking meals, but also for processing and storage for example of foods, chemicals and medicines. In particular according to the invention the term crockery item embraces laboratory flasks and glasses, laboratory crockery, reagent glasses, flasks for storing medicines and chemicals, flacons, dishes, bowls, plates, bottle coolers and drinking vessels.

The term drinking vessel in accordance with the invention is used to denote a drinking vessel irrespective of the choice of its material. A drinking vessel of glass however is preferred. Drinking vessels in accordance with the present application include beakers, handle items like cups, mugs and pitchers, decorative vessels, but also bottles or drinking bottles.

A contactless readable electronic information carrier in accordance with the present invention in an embodiment includes a carrier substrate, in particular a carrier substrate of plastic. In addition, in an embodiment the information carrier includes an electronic circuitry having a transmitting circuit for emitting a signal, a processing circuit and a permanent memory. Such electronic circuits are known in many different forms from the state of the art.

In that case individual parts of the electronic circuitry can be integrated in an integrated circuit, more specifically a chip. A signal in accordance with the present invention can be an electrical, magnetic, electromagnetic or optical signal. Preferred embodiments however are those in which the signal is modulated on to a magnetic field or an electromagnetic field.

In an embodiment of the invention the electronic circuitry of the information carrier, in addition to the circuit, also includes a receiver circuit for receiving a signal. It will be appreciated that that receiver circuit is then also connected to the processing circuit.

In an embodiment of the invention the transmitter and/or receiver circuit are analog circuits. In a further embodiment of the invention the processing circuit is a digital circuit. Such a digital processing circuit in an embodiment is a microcontroller.

In a further embodiment the circuitry also has an antenna connected to the transmitter and/or receiver circuit. It serves to emit or receive the signal in the form of a magnetic field or an electromagnetic field.

In an embodiment of the invention the electronic circuitry is an RFID transponder. Coupling between the reading device and such an RFID transponder is effected in an embodiment of the invention either by means of an alternating magnetic field of short range or by high-frequency radio waves.

In an embodiment of the invention the RFID transponder is a transponder in accordance with the NFC standard. Such transponders can be read out with conventional mobile terminal devices, for example a smartphone or a tablet, and are inexpensively available.

In an embodiment of the invention the information carrier is applied to the carrier layer by means of an applicator and is impressed into the carrier layer, wherein the applicator and the crockery item are moveable relative to each other, wherein the applicator has a camera for detecting a position of the carrier layer on the crockery item, and wherein positioning of the applicator with the information carrier relative to the crockery item is effected by means of an image, created by the camera, of the crockery item with the carrier layer. In that way the information carrier can be applied to the carrier layer in an automated procedure.

In an embodiment of the method according to the invention the information carrier is applied to the carrier layer by means of an applicator and thereby impressed into the carrier layer, wherein the applicator and the crockery item are moveable relative to each other, wherein the applicator has a contactless reading and/or writing device for reading and/or writing to the information carrier. In that way it is possible, while the information carrier is still being applied to the crockery item, on the one hand to check the applied information carrier for operability, but on the other hand to store the unique identification of the crockery item which is provided by the information carrier in a database.

The present invention therefore further concerns a printing apparatus for printing on a crockery item comprising a holder for the crockery item, a first printing head for printing a layer on to the crockery item, and an applicator which is so arranged and adapted that a contactless readable information carrier can be applied to a carrier layer on the crockery item with the applicator, wherein the applicator and the holder for the crockery item are moveable relative to each other in such a way that the information carrier can be impressed into the carrier layer on the crockery item with the applicator.

In an embodiment the applicator is in the form of a punch, wherein the punch surface is of such a configuration that the information carrier is releasably held to the punch surface, for example by a vacuum device.

With a printing apparatus of such a configuration at least the carrier layer or the cover layer can be applied by printing to the crockery item and the information carrier can be applied to and impressed into the carrier layer.

In an embodiment the first printing head is of such a configuration and arrangement that the carrier layer with a plastically deformable material can be printed on to the crockery item with the first printing head. In that way the carrier layer can be applied to the crockery item with the printing apparatus before the information carrier is applied.

In a further embodiment the printing apparatus has a second printing head, the second printing head being of such a configuration and arrangement that the cover layer of printing ink can be printed on to the carrier layer and the information carrier with the second printing head.

In an embodiment the printing apparatus includes a camera for detecting an image of the crockery item and a control means, the control means being operatively connected to the camera in such a way that in operation of the printing apparatus the control means receives image data from the camera, wherein the control means is operatively connected to a drive unit for a relative movement between the applicator and the crockery item in such a way that the drive unit in operation of the printing apparatus receives a control signal from the control means, the control means being adapted to provide that the control means in operation of the apparatus calculates from the image data a position on the carrier layer for applying the information carrier to the carrier layer and generates control signals and transmits same to the drive unit so that the information carrier is applied at the calculated position.

At least one of the above-mentioned objects is also attained by an apparatus comprising a crockery item comprising a material selected from a group consisting of glass, ceramic and plastic or a combination thereof, a carrier layer applied to a surface of the crockery item, a contactless readable electronic information carrier applied to a surface of the carrier layer, that is remote from the surface of the crockery item, and a cover layer of printing ink, wherein a base surface of the information carrier is smaller than a surface of the carrier layer, and wherein the cover layer at least portion-wise covers a surface of the information carrier, that is remote from the carrier layer, and the surface of the carrier layer, wherein the carrier layer includes a plastically deformable material, and the information carrier is impressed into the carrier layer.

All features as are produced on the crockery item by the above-described method can be provided in an embodiment as corresponding elements at or on the crockery item of the claimed apparatus.

Further advantages, features or possible uses of the present invention will be apparent from the following description of embodiments and the accompanying Figures. In the Figures identical components are denoted by the same references.

For the embodiments of the present invention described hereinafter it is assumed that an information carrier 2 is connected to a drinking glass 1. The combination of drinking glass 1 and information carrier 2 forms the apparatus according to the invention. A drinking glass, hereinafter also referred to as a glass for brevity, is an example of a crockery item in accordance with the present application.

DETAILED DESCRIPTIONS

Figure 1:
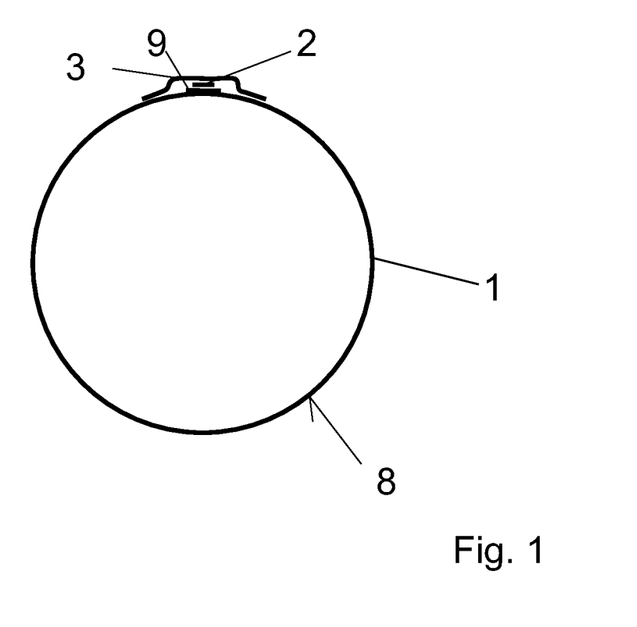
FIG. 1 is a diagrammatic cross-sectional view of a drinking glass with an information carrier connected thereto according to an embodiment of the present invention.

FIG. 1 is a diagrammatic cross-sectional view through such a drinking glass with an information carrier applied thereto. The information carrier 2 is applied on or in a carrier layer 9 on the drinking glass 1. A cover layer 3 of printing ink covers the carrier layer 8 and the information carrier 2 so that the information carrier 2 is protected by the cover layer and connected thereby to the drinking glass 1. The diagrammatic cross-sectional view in FIG. 1, independently of the specific configuration of the encapsulation of the information carrier, clearly shows the position of the information carrier 2 on the drinking glass 1. The positioning is the same for all embodiments discussed herein.

FIGS. 3 to 7 discussed hereinafter show enlarged portions from the diagrammatic view in FIG. 1 in the region of the information carrier 2. In the cross-sectional views in FIGS. 3 to 5 and FIGS. 7 and 8 the glass 1 or the surface thereof is shown in a flat form. That appears justified by virtue of the greatly enlarged view of the portion. In actual fact however the glass surface 8 of all embodiments is curved as shown in FIG. 1.

Figure 2:
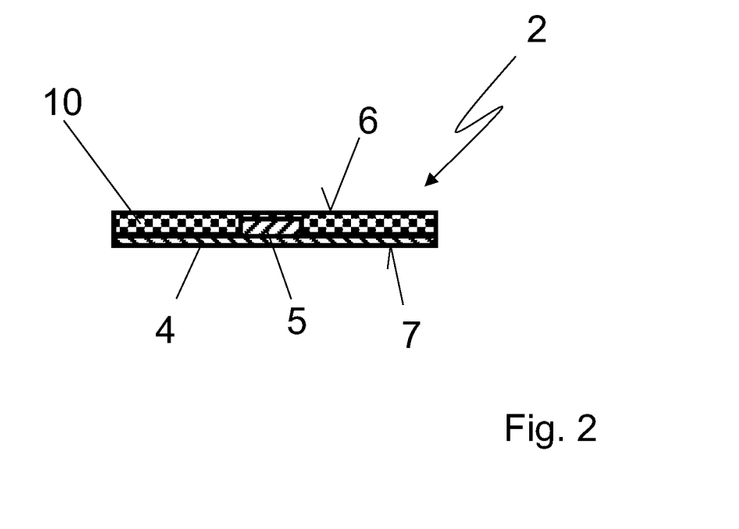
FIG. 2 is a diagrammatic cross-sectional view of an information carrier according to an embodiment of the present invention.

The information carrier considered here is an RFID transponder, as is diagrammatically shown in the cross-sectional view in FIG. 2. The transponder 2 includes a planar antenna structure printed on to a flat substrate 10 and a processing circuit integrated in a chip 5. The substrate 10 or chip label also compensates for the differences in height between the antenna 4 and the chip 5. In that way the surface 6 of the transponder 2, that is remote from the carrier layer 9, is substantially smooth, that is to say it does not have any structural depths which would obstruct printing.

The second surface 7 of the transponder 2 has a certain roughness or unevenness due to the antenna structure. As when the transponder 2 is applied to the drinking vessel 1 that surface 7 comes into engagement with the surface 12 of the carrier layer 9, that is remote from the glass surface 8, that roughness of the surface 7 however plays no part in regard to printability of the arrangement.

FIGS. 3 to 5 and FIGS. 7 and 8 show broken-away diagrammatic cross-sectional views of the drinking glass 1 of FIG. 1 at that position at which the RFID transponder 2 is fitted on to the drinking glass 1. FIGS. 3 to 7 together describe stepwise application of the individual layers to the surface 8 of the drinking glass 1.

Figure 3:
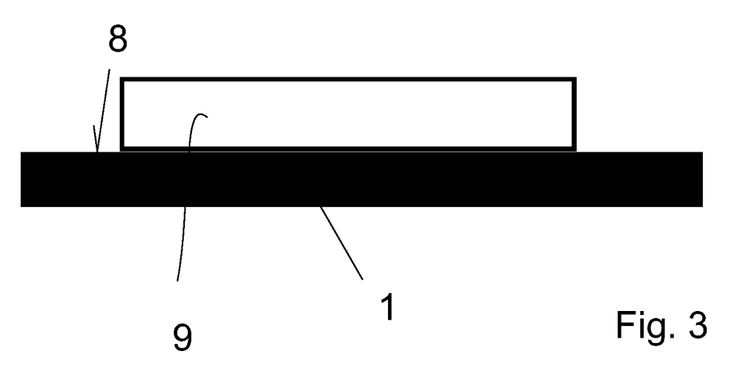
FIG. 3 is a broken-away diagrammatic cross-sectional view of the surface of a drinking glass with a carrier layer according to an embodiment of the present invention.

FIG. 3 shows the drinking glass 1 with the carrier layer 9 applied to its surface 8. In this case the carrier layer 9 comprises a thermoplastic, in the illustrated example polypropylene. Thermoplastics have the advantage for the concept according to the invention that on the one hand they can be applied by printing to the glass surface 8 by means of screen-printing technology. In other words, the carrier layer 9 can be coated with the known methods for printing the surface 8 of a drinking glass 1. In addition, the thermoplastic is plastically deformable under pressure and optionally elevated temperature.

Figure 4:
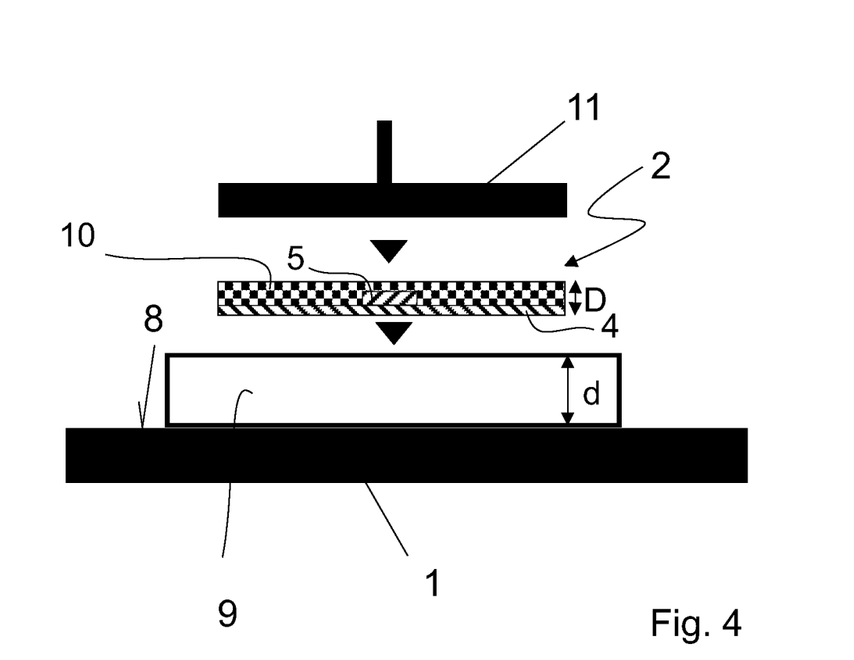
FIG. 4 is a broken-away diagrammatic cross-sectional view of the surface of the drinking glass with the carrier layer of FIG. 3 with an information carrier and an applicator prior to application of the information carrier to the carrier layer.
Figure 5:
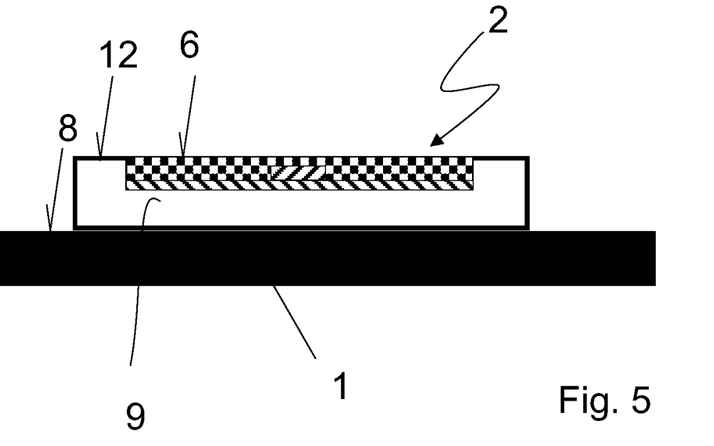
FIG. 5 is a broken-away diagrammatic cross-sectional view of the surface of the drinking glass with the carrier layer of FIG. 4 with the applied information carrier which is impressed into the surface of the carrier layer.

In FIG. 4 application of the transponder 2 to the surface 12 of the carrier layer 9, that is remote from the glass surface 8, by means of an applicator 11, is immediately imminent. The applicator 11 includes a punch having a surface which (otherwise than as is shown in FIG. 4) is substantially equal to the base surface of the transponder 2. Upon application of the transponder 2 to the surface 12 of the carrier layer 9 the transponder 2 is held by a suction device in the punch surface of the applicator 11 so that the transponder 2 can be moved with the applicator relative to the carrier layer 9. When in that respect the applicator has reached the position provided for the transponder 2 over the surface 12 of the carrier layer 9 the applicator deposits the transponder 2 so that the surface 7 of the transponder 2 comes into engagement with the surface 12 of the carrier layer 9.

As soon as the transponder 2 is in engagement with the surface 12 of the carrier layer 9 the applicator 11 presses the transponder 2 into the surface 12 in such a way that the carrier layer 9 is plastically deformed and the transponder 2 sinks into the surface 12 of the carrier layer 9. By virtue of the plastic deformability of the carrier layer 9 the transponder 2 remains in its sunk position even after the applicator 11 is lifted off. To permit the transponder 2 to sink in in that way the thickness d of the carrier layer 9 in the illustrated embodiment before the transponder 2 is pressed into the surface 12 is greater than the maximum thickness D of the transponder 2. The surface 6 of the transponder 2, that is remote from the carrier layer 9, together with the surface 12 of the carrier layer 9, that is remote from the glass surface 8, now forms a substantially smooth surface without noteworthy differences in height or displacements. In other words, the overall surface comprising the surface 6 of the transponder 2 and the surface 12 of the carrier layer 9 is of a roughness which is sufficiently small to permit a printing operation.

Figure 6:
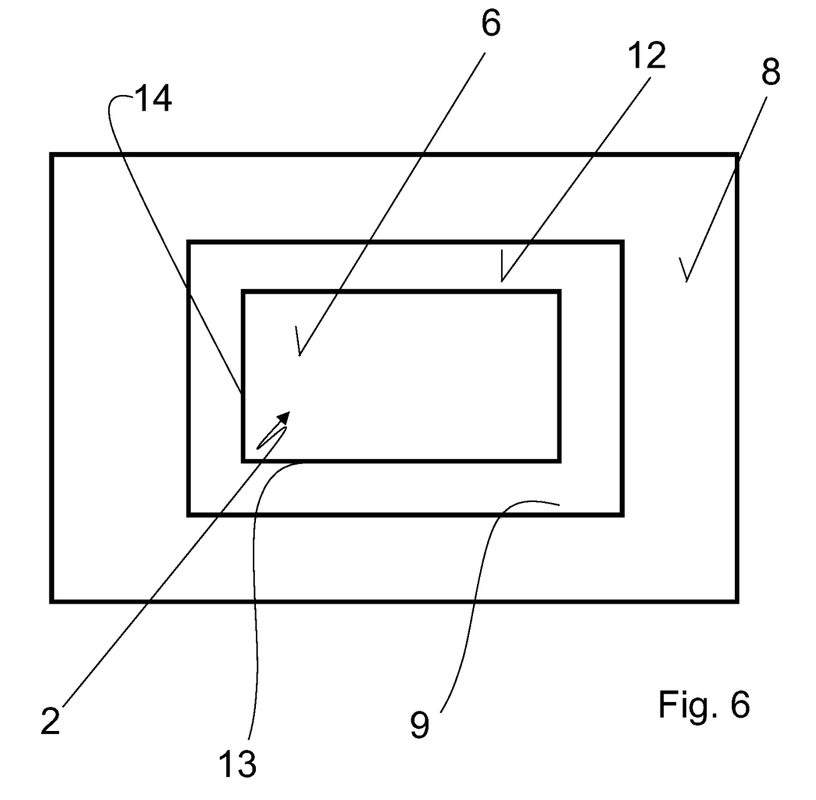
FIG. 6 is a diagrammatic plan view of the arrangement in FIG. 5.
Figure 7:
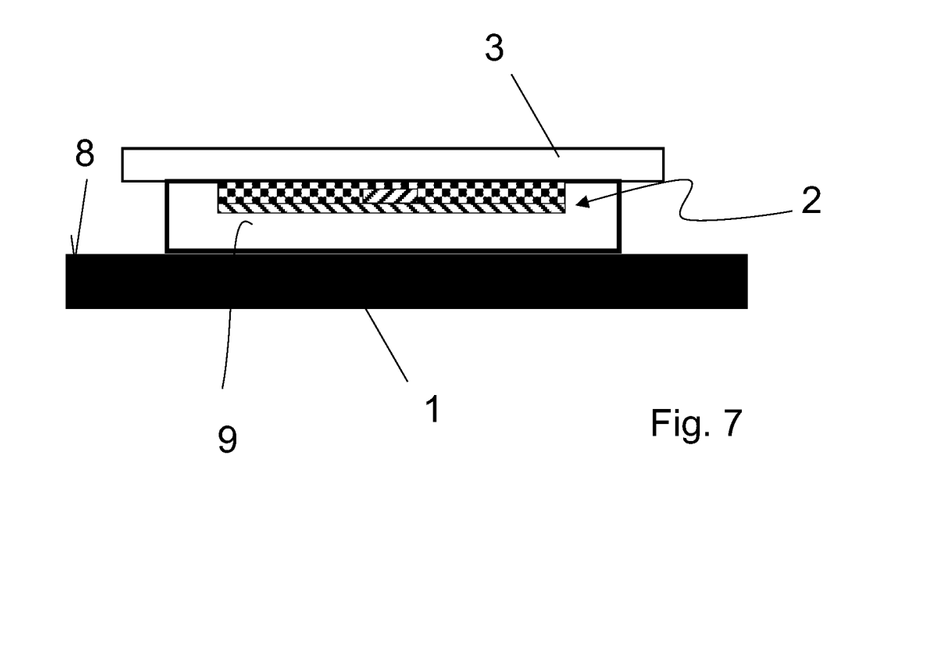
FIG. 7 is a broken-away diagrammatic cross-sectional view of the surface of the drinking glass with the arrangement of FIG. 5 with a printed cover layer.

As shown in FIG. 6 after the transponder 2 has been impressed into the surface 12 of the carrier layer the transponder 2 is surrounded completely, that is to say over its entire periphery, with the material of the carrier layer 9 in the manner of a frame. In other words, the material of the carrier layer 9 is surrounded along the longitudinal sides 13 and the transverse sides 14 by the material of the carrier layer 9.

Finally, as diagrammatically shown in the Figure the arrangement comprising the drinking glass 1, the carrier layer 9 and the transponder 2 is overprinted with a cover layer 3 of printing ink. In that case the surface of the printing ink is greater than the surface of the carrier layer so that the cover layer 3 completely covers over the carrier layer 9 and extends along the periphery of the carrier layer 9 at all locations as far as the surface 8 of the drinking glass 1. In that way the cover layer 3 completely encapsulates the arrangement of the carrier layer 9 and the transponder 2. Unlike the diagrammatic views in FIGS. 7 and 8 in that case each of the cover layers 3, 3a, 3b is also in direct engagement with the surface 8 of the drinking glass 1.

After the transponder 2 is glued on the glass 1 is printed in the region of the transponder 2 with a cover layer 3 comprising a glass ink. For a number of reasons that is found to be difficult. On the one hand two different materials have to be printed with the same glass ink of the cover layer 3, more specifically on the one hand the glass material of the drinking glass 1 and on the other hand the plastic material of the transponder 2. In addition, the glass ink 3 cannot be fired in a subsequent working step as otherwise the transponder 2 would be damaged. Therefore, the glass ink for the cover layer 3 of the embodiment of FIG. 3 but also for the cover layers 3 of all further embodiments as shown in the other Figures was carefully selected.

An organic two-component glass ink with an ink component and a hardener was adopted as the cover layer 3. That has the advantage that it is hardened comparatively quickly by warming the structure comprising glass 1, carrier layer 9, transponder 2 and cover layer 3, but managing without a firing operation. In the illustrated embodiment the glass ink of the cover layer 3 is so selected that with suitable warming to a temperature of 65° C. within 30 seconds it hardens dust-d ry.

That represents a challenge in particular for the reason that the cover layer 3 covers over the entire transponder in a thickness of 200 µm.

In addition, the printing ink is to be so selected that the ink is of high viscosity to prevent the ink from running off the structure of the transponder 2 after the printing operation and prior to drying.

Figure 8:
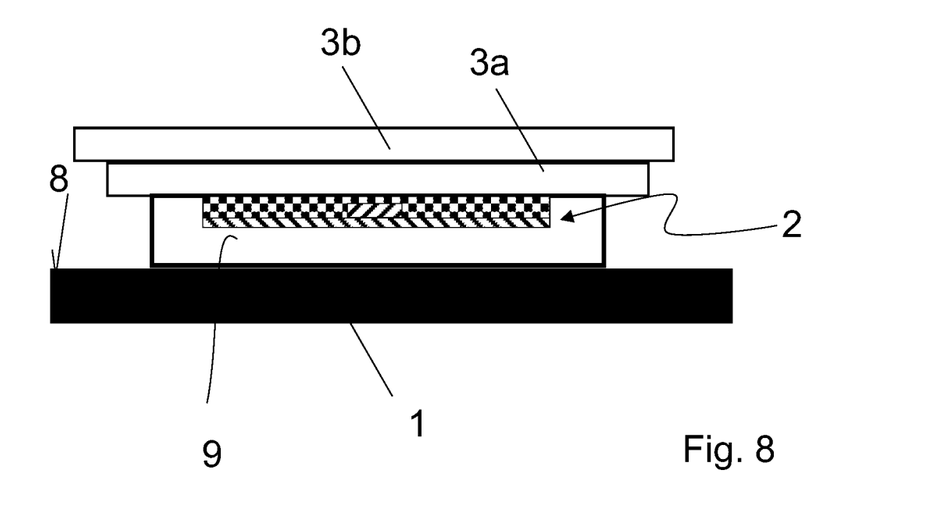
FIG. 8 is a broken-away diagrammatic cross-sectional view of an alternative embodiment with a plurality of cover layers.

In an alternative embodiment as is diagrammatically shown in FIG. 8 a plurality of cover layers 3a, 3b, in the example in FIG. 8 there being two thereof, are applied by printing in mutually superposed relationship. In that case the areas of the cover layers 3a, 3b become progressively larger upwardly so that each cover layer completely covers over all subjacent layers of the arrangement.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

A list of references includes: drinking glass 1; RFID transponder 2; cover layer 3; substrate 4; chip 5; surface 6 of the RFID transponder 2, that is remote from the surface 12 of the carrier layer 9; surface 7 of the RFID transponder 2, that is towards the surface 12 of the carrier layer 9; glass surface 8; carrier layer 9; chip label 10; applicator 11; surface 12 of the carrier layer 9, that is remote from the glass surface 8; longitudinal side 13; transverse side 14; maximum thickness D of the information carrier; and thickness d of the carrier layer 9 prior to application of the RFID transponder 2.

What is claimed is:

1. A method of connecting a crockery item to a contactless readable electronic information carrier comprising:
   providing the crockery item, the crockery item comprising a material selected from a group comprising one or more of glass, ceramic and plastic;
   applying a carrier layer to a surface of the crockery item;
   applying the information carrier to a surface of the carrier layer that is remote from the surface of the crockery item, wherein a base surface of the information carrier is smaller than a surface of the carrier layer; and
   applying a cover layer of printing ink such that the cover layer at least portion-wise covers a surface of the information carrier that is remote from the carrier layer and the surface of the carrier layer, characterized in that the carrier layer includes a plastically deformable material, wherein application of the information carrier to the carrier layer includes impressing the information carrier into the carrier layer.

2. A method according to claim 1, wherein the plastically deformable material of the carrier layer is a plastically deformable thermoplastic.

3. A method according to claim 1, characterized in that a thickness of the carrier layer prior to application of the information carrier is greater than or equal to a maximum thickness of the information carrier.

4. A method according to claim 1, characterized in that the information carrier has two longitudinal sides and two transverse sides, wherein the information carrier is surrounded by the material of the carrier layer along the longitudinal sides and the transverse sides after impression of the information carrier into the carrier layer.

5. A method according to claim 1, characterized in that after impression of the information carrier into the carrier layer, the surface of the information carrier that is remote from the surface of the carrier layer, and the surface of the carrier layer together form a closed surface with a roughness, the roughness permitting application of the carrier layer.

6. A method according to claim 1, characterized in that the carrier layer includes an adhesive material.

7. A method according to claim 1, characterized in that application of the carrier layer is effected by printing.

8. A method according to claim 1, characterized in that the cover layer completely covers the surface of the information carrier that is remote from the surface of the carrier layer and the surface of the carrier layer.

9. A method according claim 1, characterized in that a surface of the cover layer is larger than the surface of the carrier layer so that the cover layer extends over the entire periphery of the carrier layer beyond the carrier layer on to the surface of the crockery item.

10. A method according to claim 1, characterized in that application of the cover layer includes one of printing the cover layer and transferring the cover layer in the form of a printed transfer image.

11. A method according to claim 1, characterized in that a plurality of cover layers are applied one over the other.

12. A method according to claim 1, characterized in that the information carrier is applied to the carrier layer by means of an applicator and is impressed into the carrier layer, wherein the applicator and the crockery item are moveable relative to each other, wherein the applicator has a camera for detecting a position of the carrier layer on the crockery item, and wherein positioning of the applicator with the information carrier relative to the crockery item is effected by means of an image, created by the camera, of the crockery item with the carrier layer.

13. A method according to claim 1, characterized in that the information carrier is applied to the carrier layer by means of an applicator and thereby impressed into the carrier layer, wherein the applicator has a contactless reading and/or writing device for reading and/or writing to the information carrier.

14. An apparatus comprising:
   a crockery item comprising one or more of glass, ceramic and plastic;
   a carrier layer applied to a surface of the crockery item;
   a contactless readable electronic information carrier applied to a surface of the carrier layer that is remote from the surface of the crockery item; and
   a cover layer of printing ink, wherein a base surface of the information carrier is smaller than a surface of the carrier layer, and wherein the cover layer at least portion-wise covers a surface of the information carrier that is remote from the carrier layer and the surface of the carrier layer, characterized in that:
   the carrier layer includes a plastically deformable material, and
   the information carrier is impressed into the carrier layer.

* * * * *